United States Patent Office 2,943,402
Patented July 5, 1960

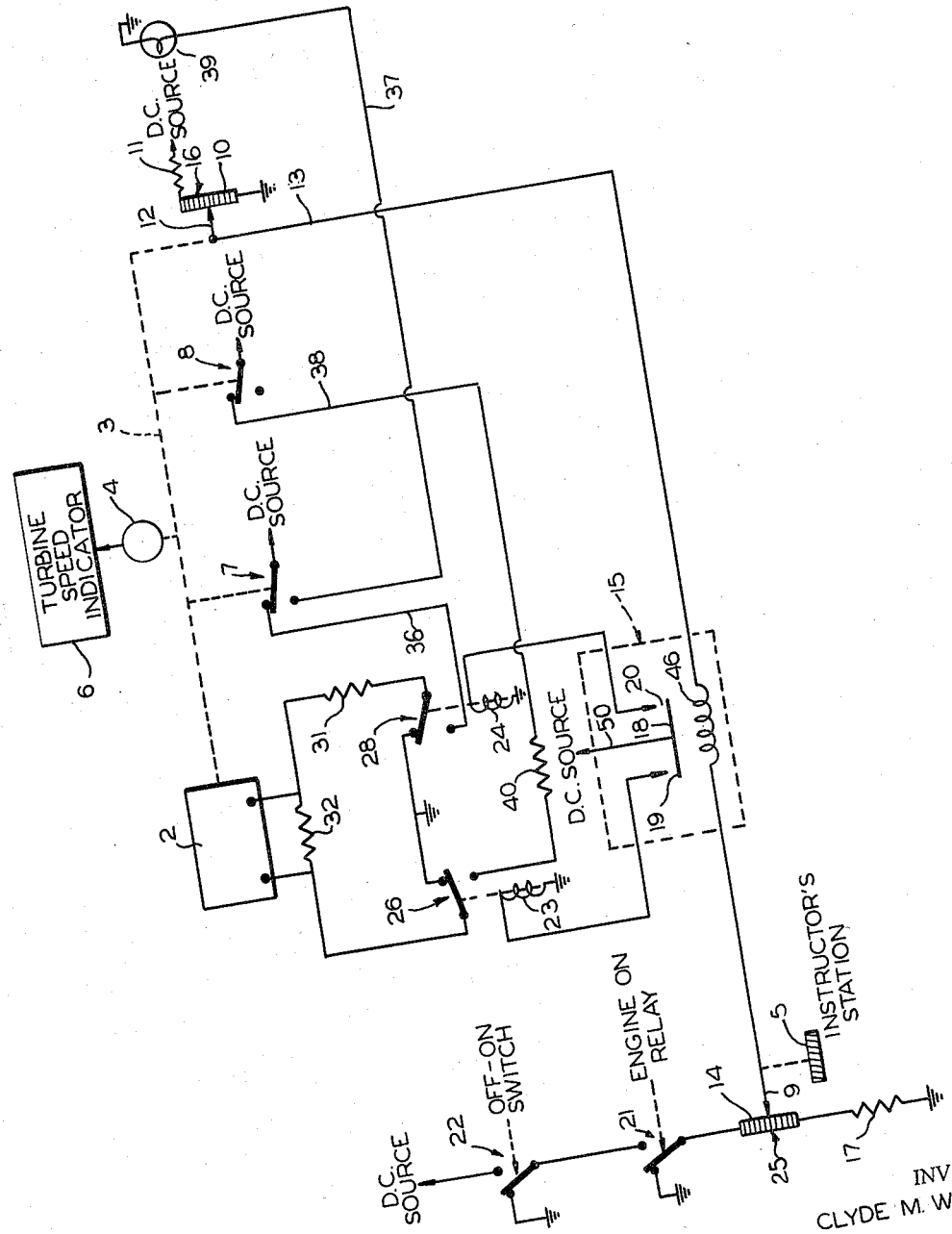

2,943,402
TURBO COMPRESSOR TACHOMETER SIMULATOR
Clyde M. Whitby, Beltsville, Md., assignor to ACF Industries, Incorporated, New York, N.Y., a corporation of New Jersey Filed Mar. 3, 1958, Ser. No. 718,661
4 Claims. (Cl. 35—12)

This invention relates generally to the simulation of a jet powered aircraft cabin air heating system and more particularly to the simulation of the turbo compressor tachometer instrument which reveals to a crewman the operational conditions of the system.

Modern aircraft are capable of climbing into the low temperatures found at great altitudes and are usually equipped with cabin heating systems to at least keep the temperature therein above freezing to thereby insure proper operation of the instruments and to add somewhat to the comfort of the crew. The usual jet powered transport type aircraft air heating and conditioning system is supplied with warm pressurized air from compressors, one mounted on each engine nacelle. These compressors are driven by turbines which take bleed air from the high pressure spool of the main propulsion engine. The turbines run only when the engine is operating and when a control valve in the turbine inlet is open. A speed sensing device on the turbine drives a tachometer instrument in the control cabin and an over-speed indicator light in the cabin shows over-speed condition. In the actual aircraft a system of this type presents to the pilot three indications that it is operating properly, namely, the tachometer showing, the over-speed light, and the flow of air being fed in to heat the cockpit area. It is the simulation of the former two indications to which this invention is directed.

It is, accordingly, a prime object of this invention to provide an electrical circuit for the realistic simulation of an aircraft air-conditioning and heating system.

It is another object of this invention to provide a circuit to indicate the speed of a turbine and a condition of over-speed thereof to student pilots.

It is a still further object of the invention to provide a system, in a grounded trainer, for indicating the rate of rotation of a turbo-compressor and having a device under the control of an instructor to affect the simulated operation of the tachometer.

The novel features of the invention are set forth in the appended claims and the invention, as to its organization and its mode of operation, will be best understood from a consideration of the following detailed description when read in connection with the accompanying drawings in which:

The single figure is a schematic wiring diagram of the turbo-compressor tachometer simulator system.

Summarily stated, the invention comprises an instrument within the field of vision of a student pilot to show the r.p.m. of a simulated turbine, a reversible motor connected to drive the same, and a servo system connected to a motor and including therein a member under the control of an instructor to energize the motor and bring about rotation in accordance with the sense and magnitude of motion of the member under the instructor's control. The system serves to stop the motor upon reaching a predetermined point corresponding to the position of instructor's control member.

Referring now to the drawing, reference character 2 designates a reversible motor having a shaft 3 to which is connected, a resolver or synchro 4 to move the movable member of the turbine speed indicator 6, which is positioned in the simulated cockpit within the view of the student pilot. A pair of limit switches 7 and 8 are mechanically fixed to shaft 3 for a purpose that will later be more fully explained, and a potentiometer 16 having a resistance winding 10 and a wiper arm 12 connected to shaft 3 receives energy from a D.C. source through resistor 11. A second potentiometer 25 having a resistance winding 14 connected to ground through impedance 17 and to a D.C. source through a pair of series connected switches 21 and 22 has a wiper arm 9 movable by control knob 5 located in the instructor's station. The voltage developed at the wiper arm 9 is connected to a polarity sensitive relay 15 having a coil 46 and a rockable member 18 connected at the mid point thereof to a D.C. source through connector 50. Straddling the rockable arm are contacts 19 and 20 respectively connected to the energizing coils 23 and 24 of relays 26 and 28. As is there shown, motor 2 is connected into a circuit formed by the armatures of relays 26 and 28 and resistor 32, across its input terminals to provide a more stable input impedance, together with resistor 31 for dynamic braking.

The two upper stationary contacts of relays 26 and 28, respectively, are connected to each other and to ground. The lower stationary contact of relay 26 is connected through resistor 40 to the upper stationary contact of limit switch 8. The lower stationary contact of relay 28 is connected through conductor 36 to the upper stationary contact of limit switch 7, which has its lower contact connected through conductor 37 to an over-speed light 39. Resistor 40 is inserted in the circuit from limit switch 8 to provide that the motor will run slower in a "turbine speed decreasing" direction than in a "turbine speed increasing" direction; which accurately reproduces this characteristic of a turbine.

During a training cycle, when cabin heating is called for, the trainee closes the off/on switch 22 and if the engine is operating, relay 21 is closed. The turbine could not of course operate without the main propulsion engine's being on and this relay is part of the engine computer, which may be of any type known in the art. If the instructor turns his control knob 5 so that wiper arm 9 moves over winding 14 to a position which may be the position there shown, then voltage from wiper 9 prevails over voltage from wiper 12 and is impressed on coil 46, causing member 18 to rock, closing contact 20, thereby energizing coil 24. Wiper arm 12 will be understood to have stopped in a position corresponding to the balancing of voltages in the servoing cycle following the last motion of wiper arm 9 by the instructor. Energizing of coil 46 through a differential of voltage impressed thereon, moves the contact 18 and the armature of relay 28 moves to its lowermost position because of the voltage across coil 24, thereby impressing voltage through switch 7 and resistor 31 to the motor 2, the return being through relay arm 26 to ground. The motor then will turn in a speed increasing direction moving synchro 4 and in turn the movable element of the turbine speed indicator 6. The element will move in accordance with the motion of wiper arm 9 and, of course, in a sense or direction corresponding to the motion of the arm. The motor will continue to run until shaft 3 moves arm 12 until the voltage from conductor 13 exactly balances the voltage from arm 9 whereby the differential voltage on coil 46 is zero and member 18 swings back to neutral position thereby opening contact 20 and de-energizing coil 24. A spring (not shown) on relay 28 returns the movable contact thereof to its upper position there shown. In this position, the motor is dynamically braked through resistor 31 and motor rotation abruptly ceases.

If the instructor wishes to test the alertness of the trainee, he may move wiper arm 9 into the maximum speed position, which is at the top of resistor element 14. Motor 2 then will be energized as hereinbefore explained and will run until limit switch 7 is actuated by a cam secured to the shaft 3. When the limit switch is actuated the source of energy to the motor is disconnected and is instead connected to indicator light 39 which is placed within the field of vision of the student. Thus, the student has, as in actual flight, a double revelation of over-speed of a turbine, namely, the moving element of the indicator being in the maximum speed position and the lighting of the indicating light. If at this time, the student opens switch 22 then voltage is removed from potentiometer 14 and the voltage derived from potentiometer 10 is applied to coil 46 thereby causing element 18 to rock in the other direction, closing contact 19 and energizing coil 23 of relay 26. The armature then moves to its lowest position whereby motor 2 is energized through limit switch 8 and resistor 40 and now turns in the opposite direction indicating to the student that the turbine is slowing down. Resistor 40 is placed in series with relay 26 whereby the motor 2 receives a lower voltage value in a decreasing direction than in the increasing direction which accurately simulates the behavior of a turbine, which tends to slow down much less rapidly than it speeds up. The motor 2 then will continue to run in the decreasing direction until limit switch 8 is actuated by a cam secured to shaft 3, such opening removing the source of energy from the motor and causing same to be dynamically braked, as hereinbefore explained. As will be understood, initial motion of the shaft 3 in a decreasing direction from the position of full maximum speed reconnects limit switch 7 thereby supplying energy to conductor 36 and the circuit is ready for the next cycle. Switch 26 is connected to the engine computer and is closed only when the engine is on and running.

If the instructor leaves his control at the maximum speed position and the student turns switch 22 on after an interval in the cycle, then the high voltage from wiper 9 will energize coil 46 and cause armature 18 to rock, closing contact 20 and energizing relay 24. The motor then will run until it moves the indicator 6 to the maximum speed position and then will be stopped by limit switch 7.

It should be understood that this invention is not limited to the specific details of construction and arrangements thereof herein illustrated and that changes and modifications may occur to those skilled in the art without departing from the spirit of the invention.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a grounded aircraft trainer a circuit for simulating to a student the behavior of a cockpit air heating system of the type using a turbine driven compressor comprising in combination an instrument to represent to a student the r.p.m. of the simulated turbine, a reversible motor to drive the moving element of said instrument, a servo system connected to said motor and including a member under the control of an instructor to energize the motor and bring about rotation thereof in accordance with the sense and magnitude of motion of said member, said servo system comprising a potentiometer having the resistance winding thereof connected to a source of energy and the wiper arm mechanically connected to the said member, a polarized relay connected to the potentiometer wiper arm and an electrical circuit between the said relay and the said motor to energize the motor in sense and magnitude in accordance with the position of the arm, and a second potentiometer having a resistance winding connected to a source of energy and the wiper arm mechanically connected to said motor and electrically connected to said relay whereby rotation of the motor responsive to the instructor's moving of the first recited potentiometer arm develops an answering voltage on the second recited potentiometer to balance the polarized relay and terminate motor rotation.

2. The invention, as set forth in claim 1, including a pair of limit switches connected to be actuated by the motor to stop rotation thereof when the moving element of the instrument reaches either of two terminal positions.

3. The invention, as set forth in claim 2, including a resistor connected in one motor conductor to thereby decrease the voltage drop on the motor whereby the said motor rotates more rapidly in one direction than the other.

4. The invention, as set forth in claim 2, including a light connected to one of the said pair of limit switches and arranged to be energized therethrough to indicate to the student a simulated condition of excessive turbine r.p.m.

References Cited in the file of this patent

UNITED STATES PATENTS

| | | |
|---|---|---|
| 2,496,617 | Burelbach | Feb. 7, 1950 |
| 2,510,161 | Wilkinson | June 6, 1950 |
| 2,687,580 | Dehmel | Aug. 31, 1954 |
| 2,810,210 | Stern et al. | Oct. 22, 1957 |